UNITED STATES PATENT OFFICE.

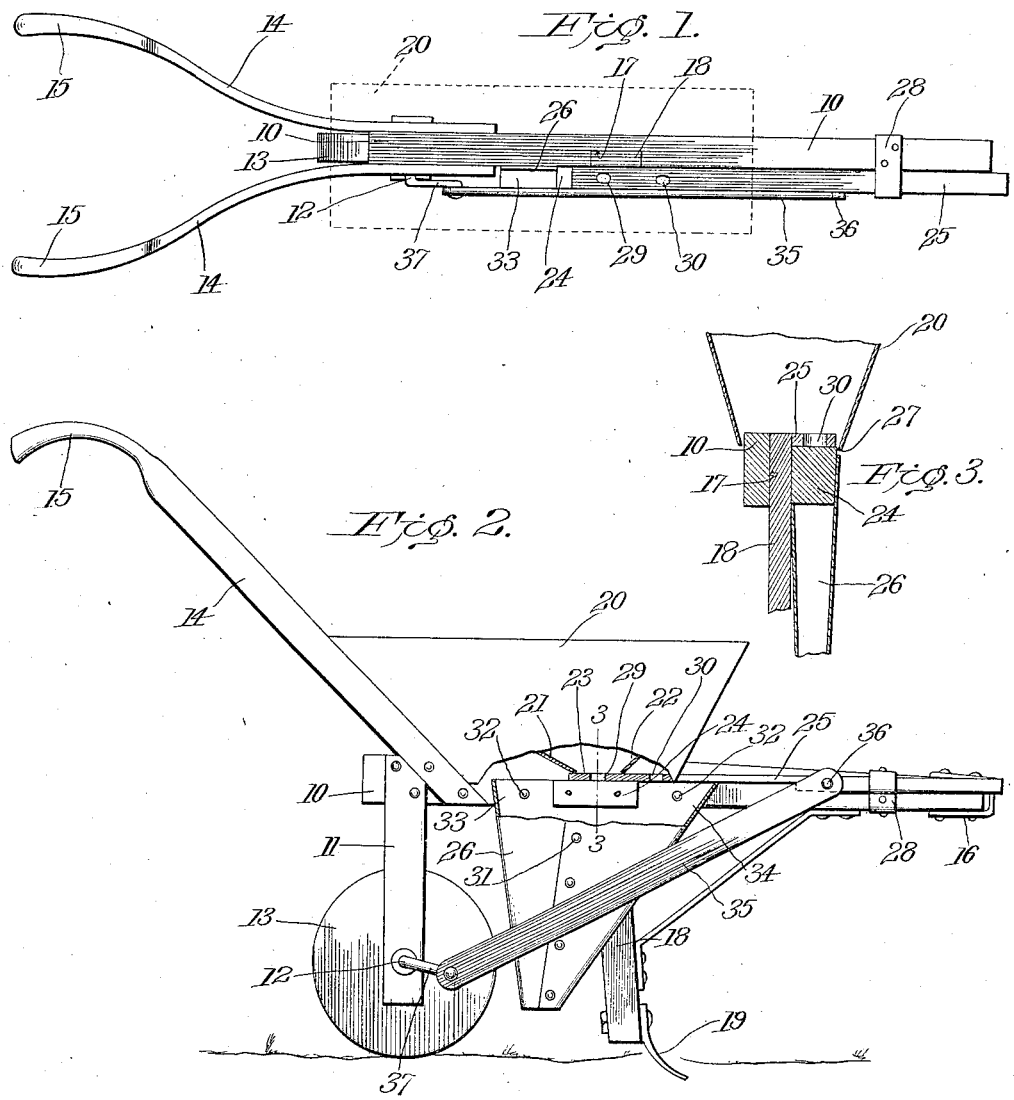

CORNELIUS K. PEGUES, OF CHERAW, SOUTH CAROLINA.

CORN AND PEA PLANTER.

1,172,308.  Specification of Letters Patent.  Patented Feb. 22, 1916.

Application filed December 2, 1914. Serial No. 875,138.

*To all whom it may concern:*

Be it known that I, CORNELIUS K. PEGUES, a citizen of the United States, and resident of Cheraw, county of Chesterfield, State of South Carolina, have invented certain new and useful Improvements in Corn and Pea Planters, of which the following is a specification.

My invention relates to seed planters generally and more particularly to a planter suitable for planting corn, peas and the like.

The particular object of my invention is to simplify the construction of the present devices of this class and to this end I provide a reciprocating slide which positively drops the seeds in the furrow at the desired point.

The machine is designed so that it will not easily get out of order and can be readily adjusted by an unskilled mechanic.

The objects and novel features of the invention will be apparent from the following description taken in connection with the drawing in which, Figure 1 is a plan view of the planter, the seed hopper thereon being simply shown in dotted outline; Fig. 2 is a side elevation of the planter, parts of the same being broken away to more clearly illustrate the invention; and Fig. 3 is a transverse sectional view on the line 3—3 of Fig. 2.

Referring to the drawing, 10 designates a horizontally disposed beam which is supported at the rear end by the standards 11 which carry a shaft 12 upon which the wheel 13 is rotatably mounted, the wheel being disposed between the standards 11. Curved handles 14, 14, extend rearwardly and upwardly from the end of the beam and are provided with the usual grips 15 at their rear ends. It will be seen that the supporting wheel 13 of the beam 10 provides a fulcrum between the front end of the beam and the grips 15, whereby the front end of the beam and the plow blade may be raised and lowered as desired. At its front end the beam 10 is provided with a suitable means 16 to which the draft animals may be hitched. The beam 10 has a notch 17 in one of its vertical sides to receive the upper end of the plow standard 18 and a plow blade 19 is secured to the lower end of said standard 18. The plow standard 18 may be suitably braced and the upper end where it fits into the notch 17 is disposed flush with the vertical side of the beam 10 to provide a smooth surface for a purpose to be described.

A hopper 20 for the seeds to be planted is mounted on the upper side of the beam 10 and also secured to the handles 14. On the interior of the hopper 20 there are slanting surfaces 21 and 22 inclined to an opening 23 located at the bottom of the hopper.

A block 24 is fastened to the notched side of the beam and fits across the upper end of the plow standard 18 in said notch to hold it in place. The block 24 is located a slight distance below the opening 23 in the bottom of the hopper 20 and serves as a supporting and guiding member for the slide 25 which moves the seeds one at a time from the hopper 20 to the chute 26. It will be seen that the lower edge of the hopper 20 extends below the top surface of the block 24, as at 27, and the side wall of the hopper with the side of the beam 10 therefore confine the slide 25 laterally while it is confined vertically between the block 24 and the lower ends of the walls 21 and 22.

A metal plate 28 is fastened near the outer end of the beam 10 and is bent to form a guiding member through which the outer end of the slide 25 extends. Near its inner end the slide 25 is provided with the two spaced holes 29 and 30 which extend through it from one face to the other. The holes 29 and 30, when they are disposed below the opening 23 in the bottom of the hopper, form pockets to receive the seeds, the top surface of the block 24 forming the bottom of the pockets. As the slide 25 is reciprocated the openings 29 and 30 move past the opposite ends of the block 24 and deposit the seed or seeds into the chute 26 from which they are dropped into the furrow made by the blade 19, the wheel 13 then serving to press the seed into the ground and cover it.

The chute 26 is formed from a single piece of sheet metal and is bent into shape and riveted along the overlapped edges 31. The chute is secured to the side of the beam 10 by suitable fastening means 32 on opposite sides of the block 24. The wall of the chute between the fastening devices 32 is notched to receive the block 24 so that the upper end of the chute will be disposed close to the under side of the slide 25 and so that inlet openings 33 and 34 will be provided at either end of the block 24 to receive the seeds delivered from the openings 29 and 30 respectively. It will be understood of course that the slide 25 may be provided with only one or any other number of openings corresponding to the openings 29 and 30.

In order to reciprocate the slide 25 as the planter is moved over the ground I provide a connecting rod 35 which is pivotally connected as at 36 to the side of the slide 25 at a point between the hopper 20 and bracket 28. The opposite end of the connecting rod 35 is pivoted on a crank 37 which rotates with the wheel 13. The throw of the crank 37 is sufficient to move the slide 25 so that the opening 29 will move from the opening 23 in the bottom of the hopper 20 to the inlet opening 33 of the chute, the opening 30 being simultaneously moved from the inlet opening 34 to the opening 23 in the bottom of the hopper 20.

The operation of the planter will be understood from the foregoing description. While I have shown and described the same in detail it is to be understood that various minor changes may be made without departing from the spirit of the invention.

Having described my invention what I claim and desire to secure by Letters-Patent is, In a seed planter, the combination of a beam having a notch on one side, a plow standard fitting said notch, a block secured to the side of the beam below the upper surface of the latter and extending across said notch, a slide movable upon said block and guided at one side by said beam, a hopper secured to and extending at its sides below the upper face of the beam and serving as a guide for the opposite side of said slide, a bracket on the beam serving as a guide for the forward end of the slide, a delivery chute below the slide, and means for reciprocating the slide consisting of a rod pivotally connected thereto in front of the hopper and to the wheel.

In testimony whereof I affix my signature in presence of two witnesses.

CORNELIUS K. PEGUES.

Witnesses:
S. C. GRAHAM,
J. MORRIS, Jr.

Copies of this patent may be obtained for five cents each, by addressing the "Commissioner of Patents, Washington, D. C."